Patented May 22, 1923.

1,456,369

UNITED STATES PATENT OFFICE.

EMILE DE STUBNER, OF NEW YORK, N. Y., ASSIGNOR TO COLUMBIA GRAPHOPHONE MANUFACTURING COMPANY, OF BRIDGEPORT, CONNECTICUT, A CORPORATION OF DELAWARE.

THERMOPLASTIC COMPOSITION AND PROCESS OF COMPOUNDING THE SAME.

No Drawing. Application filed December 14, 1918. Serial No. 266,792.

*To all whom it may concern:*

Be it known that I, EMILE DE STUBNER, citizen of the Republic of Switzerland, and a resident of the city, county, and State of New York, have invented the new and useful Improvements in Thermoplastic Compositions and Processes of Compounding the Same set forth in the following specification.

In thermoplastic compositions in which two of the ingredients are flock and shellac, difficulty is experienced in thoroughly saturating the flock with the shellac without overheating the shellac or without the addition of substances that deleteriously affect the final product. If a mixture of shellac and flock is heated to a temperature at or near the melting point of shellac and kept at such temperature for a protracted period, the shellac loses much of its original strength and elasticity although under these conditions a proper compounding of the shellac and flock can be effected.

Attempts have been made to increase the fluidity of shellac at lower temperatures by the addition of shellac solvents such as beta-napthol, nitro-napthol, nitro-benzol, alcohol or the like, but pressings made of such compositions deteriorate quickly. Rosin has also been used; but a rosin-shellac binder does not produce a satisfactory composition: it lacks strength and elasticity. Copal resins have also been used but without satisfactory results. They melt at a higher temperature than the shellacs and do not lose their identity in any shellac compound.

In such mixtures the microscope discloses the presence of parts in which the copal resin powder exists in its original state; parts in which it has thoroughly saturated the flock and parts in which it has compounded satisfactorily with the fillers,—all embedded in a surrounding mixture of shellac and filler. In short, the copal resins remain largely undissolved in the shellac binder and perform practically no other function than as a filler. They have, however, certain qualities which make them valuable in the manufacture of thermoplastic compositions, namely, their greater hardness than shellac at normal temperatures and their stability, as compared with shellac, to withstand high temperatures for protracted periods. This latter quality makes them especially desirable as saturating media for flock but their hardness is such as to make the use of shellac essential if the composition is to be successfully used in the making of phonograph records.

But as explained above it has not been possible heretofore to form a homogeneous mixture of copal and shellac resins so that no technical advantage has been derived from such mixture.

It is an object of my invention to provide a common solvent for the copal and shellac resins so as to make possible the compounding of such resins into one homogeneous mass having the advantages of the greater hardness and high crushing strength of the copal resins and the toughness and elasticity of the shellac resins; and I have discovered that the unsaturated fatty acids derived by splitting off the gylcerine from drying oils such as linseed oil, perilla oil, China-wood oil, etc., are common solvents of the said resins said acids belonging to the linoleic and olefinic groups.

The manner of compounding the new composition will now be set forth with more particularity. Thermoplastic compositions usually consist of a filler, which may be baryta, china clay or the like; fibrous material commonly known as flock; suitable coloring matter; and a binder, the latter comprising in the present instance shellac and copal resins combined with the solvent aforesaid.

The proportions by weight giving the best results for the manufacture of phonograph records are: shellac 20 to 30 parts; filler 60 to 70; coloring matter, say, 2; copal 4; flock 7; copal and shellac solvent 1. The shellac, filler and coloring matter are finely comminuted and all thoroughly mixed. The copal, flock and common resin solvent are mixed and heated to a moderate temperature, say 265° Fah. for a period long enough to effect thorough saturation of the flock,—thirty minutes, more or less, will usually be found sufficient. The time required depends somewhat upon the total quantity of the mixture but in general, the longer the treatment is continued (within reasonable limits) the better it is.

The two mixtures are now ready to be combined. The copal-flock-solvent mixture, however, is preferably first allowed to become hardened to permit grinding of the same after which it is combined with the first-mentioned mixture; but it may be added thereto while in its plastic state. In any event, the combined mixtures are thoroughly mixed and heated at the same moderate temperature aforesaid for about fifteen minutes or until a homogeneous mass is obtained.

Owing to the presence of the common resin solvent in the second mixture the particles of shellac in the first mixture enter readily and completely into direct and intimate contact with the particles of the second mixture, and vice versa, throughout the entire mass; and this is particularly true of the flock fibres therein any air and moisture in the one mixture being replaced by the ingredients of the other mixture either in their combined or separate states. The resultant composition is allowed to cool and harden in any form that is convenient or suitable for subsequent use.

This new composition has been found superior to any other known thermoplastic composition. It becomes sufficiently plastic for moulding purposes at comparatively moderate temperatures, and within a comparatively short time, without losing its cohesion or becoming disintegrated or otherwise deleteriously affected by the treatment; and, after being moulded or pressed into the desired form, it cools and sets and becomes hardened without warping, cracking or breaking, and without losing any of the impressions imparted to it; and remains tougher and less brittle, yet harder and more permanently set, than any thermoplastic composition heretofore known. Owing to these properties, the new composition is susceptible of receiving and permanently retaining the most delicate and minute impressions that may be imparted to it while in its heat-softened condition; and a high gloss (or other surfacing) upon the face of the mould will result in a permanent high gloss (or other corresponding surfacing) upon the impressed face of the material.

One form or expression of the invention has been described with great particularity of detail, but only for the sake of clearness. It is obvious that the inventive thought, the spirit of the invention, can be rendered available in many different ways, and by the substitution of many different ingredients, and in greatly-varying proportions, and that the main feature of the invention is the discovery of a common solvent for shellac and copal resins. It will therefore be understood that the composition described is to be taken merely as an illustration of the application of my discovery and that the scope of the invention is defined by the appended claims.

What I claim as new and desire to secure by Letters Patent is:—

1. The process of introducing shellac into fibrous material to produce a thermoplastic composition which consists in first heating the said material with unsaturated fatty acids derived from drying oils and a resin of higher melting point than shellac, and then incorporating the shellac by the application of heat.

2. The process of introducing shellac into fibrous material to produce a moldable composition which consists in first heating the said material with unsaturated fatty acids derived from drying oils and copal resin, and then incorporating the shellac by the application of heat.

3. The process of combining shellac and copal resins into a moldable, thermoplastic solid solution which consists in heating the same with unsaturated fatty acids derived from drying oils.

4. The process of making a thermoplastic composition adapted for use in sound-record manufacture, and containing fibrous material, shellac and copal resins and unsaturated fatty acids derived from drying oils which consists in first heating the fibrous materials, copal resin and unsaturated fatty acids, and then incorporating the shellac by the application of heat.

5. The process of making a thermoplastic composition adapted for use in sound-record manufacture, and containing fibrous material, shellac and copal resins, a suitable filler and unsaturated fatty acids derived from drying oils which consists in first heating the fibrous material, copal resin and said acids, and then incorporating the shellac and filler by the application of heat.

6. The process as in claim 4, the temperature of the first heating being approximately two-hundred-sixty-five degrees Fahrenheit and continued for approximately thirty minutes, the temperature of the second heating being substantially the same as the first and continued for approximately fifteen minutes.

7. A thermoplastic composition containing shellac and copal resins, and a common solvent consisting of unsaturated fatty acids derived from drying oils.

8. A thermoplastic composition adapted for use in sound-records, comprising shellac combined with copal resins, and a common solvent consisting of linoleic acids.

9. A thermoplastic composition containing resins and a solvent consisting of unsaturated fatty acids derived by splitting off glycerine from drying oils.

10. A thermoplastic composition as in claim 9 and containing shellac.

11. A thermoplastic composition comprising copal resins, and a solid solvent consisting of unsaturated fatty acids derived from drying oils.

12. A thermoplastic composition containing shellac, copal resins and a solid solvent consisting of a propriolic acid.

13. A thermoplastic composition, comprising a homogeneous mixture of fillers, resins of the shellac and of the copal groups, and an unsaturated fatty acid derived by splitting off glycerine from drying oils.

14. A thermoplastic composition, comprising a homogeneous mixture of fillers, resins of the shellac and of the copal groups, and an unsaturated fatty acid of the propriolic series derived by splitting off gylcerine from drying oils.

15. A thermoplastic composition, comprising a homogeneous mixture of a fibrous material, fillers, resins of the shellac and of the copal groups, and an unsaturated fatty acid derived by splitting off glycerine from drying oils.

16. A thermoplastic composition, comprising a homogeneous mixture of shellac, other resins of the shellac and of the copal groups, and an unsaturated fatty acid derived from drying oils.

17. A thermoplastic composition, comprising a homogeneous mixture of fillers, shellac, copal, and an unsaturated fatty acid derived from linseed oil.

18. A thermoplastic composition, comprising a homogeneous mixture of fillers, shellac, copal, and linoleic acid.

19. A thermoplastic composition, comprising a homogeneous mixture of fillers, flock, shellac, copal, and linoleic acid.

20. The process of making a thermoplastic fibrous shellac composition, which comprises incorporating shellac in fibrous material by heating at a temperature and for a period of time sufficient to cause replacement of air and moisture in the fibrous material by the shellac.

21. The process of making a thermoplastic composition, which comprises heating flock with copal, in the presence of linoleic acid, at a temperature and for a period of time sufficient to saturate the flock with copal, adding shellac and fillers, and compounding the mixture until homogeneous.

22. The process of making a thermoplastic composition, which comprises treating fibrous material with copal, in the presence of a material which will cause the composition to become fluid at a temperature lower than the melting point of shellac, and then adding shellac thereto.

23. The process of making a dry, air-free, shellac-flock composition, which comprises treating flock with copal, in the presence of an unsaturated fatty acid of the propriolic series, and then incorporating undeteriorated shellac into the mixture by treating the same to cause replacement of air and moisture in the mixture by the shellac.

24. A thermoplastic composition comprising a homogeneous mixture of resins of substantially the characteristics of the shellac and of the copal groups and a common solvent.

25. A thermoplastic composition comprising a homogeneous mixture of resins of substantially the characteristics of the shellac and of the copal groups and an unsaturated fatty acid derived from drying oils.

26. A thermoplastic composition comprising a homogeneous mixture of resins of substantially the characteristics of the shellac and of the copal groups and an unsaturated fatty acid of the propriolic series.

In testimony whereof I affix my signature in the presence of two witnesses.

EMILE DE STUBNER.

Witnesses:
C. M. GOLDSTEIN,
GLADYS CRAWLEY.